United States Patent
Xie et al.

(10) Patent No.: US 11,619,020 B2
(45) Date of Patent: Apr. 4, 2023

(54) SLUDGE THREE-DIMENSIONAL ELECTROOSMOSIS DRAINAGE REINFORCEMENT METHOD BASED ON ELECTRIC GEOTEXTILE COMPLEX

(71) Applicant: ZHEJIANG UNIVERSITY, Hangzhou (CN)

(72) Inventors: Xinyu Xie, Hangzhou (CN); Shangqi Ge, Hangzhou (CN); Lingwei Zheng, Hangzhou (CN); Xunli Zhang, Hangzhou (CN); Huai Nie, Hangzhou (CN); Xuexin Huang, Hangzhou (CN); Kang Zhang, Hangzhou (CN); Puxiu Dai, Hangzhou (CN); Minyang Sun, Hangzhou (CN); Chunyang Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/546,064

(22) Filed: Dec. 9, 2021

(65) Prior Publication Data
US 2022/0178101 A1 Jun. 9, 2022

Related U.S. Application Data

(63) Continuation of application No. PCT/CN2021/097040, filed on May 29, 2021.

(30) Foreign Application Priority Data

Dec. 3, 2020 (CN) .......................... 202011410834.1

(51) Int. Cl.
*E02D 3/11* (2006.01)
*C02F 11/15* (2019.01)
(Continued)

(52) U.S. Cl.
CPC ................ *E02D 3/11* (2013.01); *B01D 61/56* (2013.01); *C02F 11/15* (2019.01); *B32B 5/022* (2013.01);
(Continued)

(58) Field of Classification Search
CPC ... E02D 3/10; E02D 3/11; E02B 11/00; E02B 11/005; C02F 11/15; B01D 61/56
See application file for complete search history.

(56) References Cited

U.S. PATENT DOCUMENTS 6,736,568 B1    5/2004  Pugh et al.
2008/0271999 A1* 11/2008 Jones ..................... B01D 61/56
                                                 204/450

FOREIGN PATENT DOCUMENTS

CN    101555689 A    10/2009
CN    202718085 U    2/2013
(Continued)

OTHER PUBLICATIONS

International Search Report (PCT/CN2021/097040); dated Aug. 26, 2021.
(Continued)

*Primary Examiner* — Frederick L Lagman
(74) *Attorney, Agent, or Firm* — W&G Law Group

(57) ABSTRACT

Disclosed is a sludge three-dimensional electroosmosis drainage reinforcing method based on a novel electric geotextile complex, and belongs to the field of soft soil foundation reinforcement. A novel electric geotextile complex is adopted, and a designed multidirectional three-dimensional continuous electroosmosis drainage method is adopted to perform rapid drainage reinforcement treatment on sludge, wherein the electric geotextile complex is prepared by combining fibers and conductive materials with a flexible drainage plate and has the effects of electric conductive, (Continued)

drainage, corrosion resistance and reinforcement. The proposed drainage method can realize the electroosmotic drainage in vertical and horizontal directions. Through layer by layer electroosmosis from bottom to top, the consolidation drainage effect of sludge in the lower layer can be enhanced by the increasing loading pressure from the upper sludge. After the vertical electroosmosis is completed, the method of exchange electrode is used to conduct horizontal electroosmosis in opposite direction.

4 Claims, 2 Drawing Sheets

(51) Int. Cl.
*B01D 61/56* (2006.01)
*B32B 5/02* (2006.01)
*B32B 27/32* (2006.01)
*B32B 27/12* (2006.01)
*B32B 7/09* (2019.01)

(52) U.S. Cl.
CPC .............. *B32B 7/09* (2019.01); *B32B 27/12* (2013.01); *B32B 27/32* (2013.01); *B32B 2262/0276* (2013.01); *B32B 2262/106* (2013.01); *B32B 2264/108* (2013.01); *B32B 2307/202* (2013.01); *B32B 2307/726* (2013.01); *E02D 2200/17* (2013.01); *E02D 2300/001* (2013.01); *E02D 2300/0009* (2013.01); *E02D 2300/009* (2013.01); *E02D 2300/0054* (2013.01); *E02D 2300/0089* (2013.01)

(56) References Cited

FOREIGN PATENT DOCUMENTS

| | | | | | |
|---|---|---|---|---|---|
| CN | 103015401 | A | * | 4/2013 | |
| CN | 103395957 | A | * | 11/2013 | |
| CN | 103866760 | A | | 6/2014 | |
| CN | 105568955 | A | | 5/2016 | |
| CN | 105735075 | A | * | 7/2016 | ............... E02D 3/11 |
| CN | 107503160 | A | | 12/2017 | |
| CN | 207934014 | U | | 10/2018 | |
| CN | 109208577 | A | | 1/2019 | |
| CN | 109252506 | A | * | 1/2019 | ............... E02D 3/11 |
| CN | 109339028 | A | * | 2/2019 | ............... E02D 3/11 |
| CN | 109989390 | A | * | 7/2019 | ............... E02D 3/11 |
| CN | 111101501 | A | | 5/2020 | |
| CN | 111794258 | A | * | 10/2020 | ............. E02D 17/02 |
| CN | 111809605 | A | * | 10/2020 | ............... E02D 3/11 |
| CN | 212052705 | U | | 12/2020 | |
| CN | 112359811 | A | * | 2/2021 | ............... E02D 3/02 |
| CN | 112482346 | A | | 3/2021 | |
| CN | 112505291 | A | * | 3/2021 | |
| JP | 2002538333 | A | | 11/2002 | |

OTHER PUBLICATIONS

First Office Action(202011410834.1); dated Jul. 26, 2021.
An Introduction to Electrokinetic Geosynthetics and their Application; Date of Mailing: Feb. 25, 2008.

* cited by examiner

SLUDGE THREE-DIMENSIONAL ELECTROOSMOSIS DRAINAGE REINFORCEMENT METHOD BASED ON ELECTRIC GEOTEXTILE COMPLEX

CROSS-REFERENCE TO RELATED APPLICATIONS

The present application is a continuation of International Application No. PCT/CN2021/097040, filed on May 29, 2021, which claims priority to Chinese Application No. 202011410834.1, filed on Dec. 3, 2020, the contents of both of which are incorporated herein by reference in their entireties.

TECHNICAL FIELD

The present application belongs to the field of electroosmosis reinforcement of sludge with a high water content, and particularly relates to a sludge three-dimensional electroosmosis drainage reinforcement method based on an electric geotextile complex.

BACKGROUND

There are many rivers distributed in the coastal areas of China. With the sediment deposition, a large amount of river sludge and mudflat sludge will be produced, which will lead to problems such as riverbed sedimentation and river shallowing, and thus it is necessary to carry out regular dredging treatment. The sludge obtained from dredging often has the characteristics of high water content, high compressibility, low strength and low permeability, and some treatments are required to meet the requirements of foundation bearing capacity. Electroosmosis, as a soft soil foundation treatment method, can quickly drain water and reinforce river sludge.

When the sludge or soft soil foundation with high water content is reinforced by electroosmosis, there are some problems such as serious electrode corrosion and high energy consumption in the middle and later stages of electroosmosis process when traditional metal materials are used as electrodes. In recent years, the use of electric geosynthetics has solved these problems to a certain extent, but common electric geosynthetics such as stainless steel electric geosynthetics have problems such as a high price and a poor corrosion resistance. Moreover, in some geosynthetics, there are conductive wires between two drainage plates, rather than that the conductive materials direct contact with soil. As a result, the contact resistance between geosynthetics and soil is too high, which reduces the electroosmotic consolidation efficiency.

In traditional electroosmosis reinforcement methods, electrode plates or electric geotechnical materials are often vertically punched into the soft soil for horizontal electroosmosis consolidation, and in few cases electrode materials are paved for vertical electroosmosis consolidation of soft soil. Regardless of horizontal or vertical electroosmosis treatment, reinforcing soft soil by electroosmosis in a single direction will cause problems such as uneven electroosmosis treatment effect, high local water content, and increase of energy consumption caused by the separation of electrodes from soil.

SUMMARY

To solve the problems of serious corrosion and high price of electrode materials, uneven electroosmosis treatment effect, et al., in the electroosmosis process. The present application provides a sludge three-dimensional electroosmosis drainage reinforcement method based on an electric geotextile complex.

The purpose of the present application is realized by the following technical solution: a sludge three-dimensional electroosmotic drainage reinforcement method based on an electric geotextile complex, wherein a designed electric geotextile complex is adopted to carry out rapid electroosmotic drainage reinforcement treatment on sludge by a three-dimensional and continuous electroosmotic drainage method, which includes the following steps:

(1) constructing the electric geotextile complex, wherein the electric geotextile complex is a complex with a three-layer structure, an upper layer and a lower layer are electric geotextiles formed by fibers and conductive materials interwoven with each other, and a middle layer is a flexible drainage plate; a drainage channel is arranged in the flexible drainage plate, a drainage hole is arranged on the surface, and three layers are flexibly overlapped and fixed;

(2) during construction, paving a layer of the electric geotextile complex at a bottom of a site, spreading or hydraulically filling the sludge on the geotextile complex, then covering a new layer of the electric geotextile complex, arranging drainage ditches on both sides of the upper geotextile complex, and inserting vertical flexible conductive tubes on both sides of the geotextile complex to complete paving of a first layer;

(3) connecting the upper geotextile complex of the first layer to a cathode of a power supply, and connecting the lower geotextile complex to an anode of the power supply; powering on to start electroosmosis (the electroosmotic flow direction is vertically upward) and collecting discharged water by the drainage ditches on both sides;

(4) after electroosmosis of the first layer is completed, paving another layer of sludge on the electric geotextile complex, and then covering a new layer of the electric geotextile complex on the top of the sludge; arranging drainage ditches on both sides of the upper geotextile complex, and inserting vertical flexible conductive tubes on both sides of the geotextile complex to be connected with the vertical flexible conductive tubes that is inserted into the sludge in the first layer, then, paving of the second layer is completed; connecting the upper geotextile complex of the second layer to the cathode of the power supply, and connecting the lower geotextile complex to the anode of the power supply; powering on to start electroosmosis (at this time, the cathode in step (3) is converted into an anode in step (4)) and collecting discharged water by the drainage ditches on both sides; repeating the above process, and paving the sludge layer by layer for electroosmosis;

(5) after loading of a plurality of layers of the sludge is completed, vertical flexible conductive tubes in all layers are connected at both sides, finally connecting all conductive tubes on one side to the anode of the power supply and all conductive tubes on the other side to the cathode of the power supply, so as to implement a horizontal integral electroosmosis drainage reinforcement (the electroosmotic flow direction is horizontal), and collecting discharged water by the drainage ditch on a cathode side.

Furthermore, in the step (5), after completing one time of horizontal electroosmotic drainage reinforcement, the cathode and the anode are exchanged, and the electroosmotic drainage reinforcement in an opposite direction is started, so that the effect of water content reduction in the sludge is balanced, and the overall drainage effect is improved.

Furthermore, the fibers of the electric geotextile are terylene, polyester fiber and non-woven fabric, et al., which have good water permeability and are capable of filtering the sludge at the same time; the conductive materials are carbon fiber, carbon black, graphite powder and conductive metals, et al.; the proportion of the conductive materials in the electric geotextile cannot be less than 5% by mass.

Furthermore, the drainage hole on the surface of the flexible drainage plate is used for collecting the water discharged from the surrounding sludge, and the internal drainage channel is used for horizontally discharge the water in the sludge into a drainage ditch.

Furthermore, the flexible drainage plate is made of plastic with good flexibility, and can be prepared by mixing polypropylene (PP) and polyethylene (PE), with both rigidity and flexibility.

Furthermore, the three layers of the electric geotextile complex are flexibly overlapped and fixed by terylene or polyester fibers, so that the three layers are integral without sliding.

Furthermore, each layer is firstly subjected to electroosmosis drainage in a vertical direction, and finally subjected to integral electroosmosis reinforcement in a horizontal direction.

Furthermore, when electroosmosis drainage is carried out, an increasing preloading pressure on an upper part will have a consolidation drainage action on the sludge in a lower layer. And at the same time, increase a constraining force on each layer of the geotextile complex, thus enhancing the reinforcement effect of the geotextile complex on the soil body.

The present application has the following advantages and effects.

1. The electric geotextile complex is made of fibers, conductive materials and drainage plates. The use of fibers is environmentally friendly and cheap. At the same time, the electric geotextile complex has a strong resistance to acid and alkali corrosion and is conductive, and is easy for construction.

2. The geotextile complex has good tensile properties and can form a good reinforcement effect on soil.

3. In the proposed three-dimensional continuous electroosmosis drainage method, drainage is firstly implemented in the vertical direction layer by layer, and finally integral drainage is implemented in the horizontal direction, so that the sludge can be consolidated and drained quickly and uniformly.

4. While electroosmosis drainage is being carried out, the increasing preloading pressure on the upper part will accelerate the gravity drainage and consolidation of the subsoil, and at the same time increase the constraining force on each layer of the geotextile complex, thus enhancing the reinforcement effect of the geotextile complex on the soil.

Reference signs: 1—fiber; 2—conductive material; 3—flexible lap joint; 4—electric geotextile; 5—flexible drainage plate; 6—drainage hole; 7—drainage channel; 8—geotextile complex; 9—drainage ditch; 10—sludge; 11—electroosmosis water flow direction being vertically upward; 12—cathode; 13—anode; 14—flexible conductive tube; 15—horizontal electroosmotic flow direction.

DESCRIPTION OF EMBODIMENTS

The present application will be further explained with specific embodiments below, but the present application is not limited by the embodiments.

An embodiment of the present application provides a sludge three-dimensional electroosmotic drainage reinforcement method based on an electric geotextile complex, which adopts a designed electric geotextile complex to carry out rapid electroosmotic drainage reinforcement treatment on the sludge by a three-dimensional and continuous electroosmotic drainage method.

Figure 1:
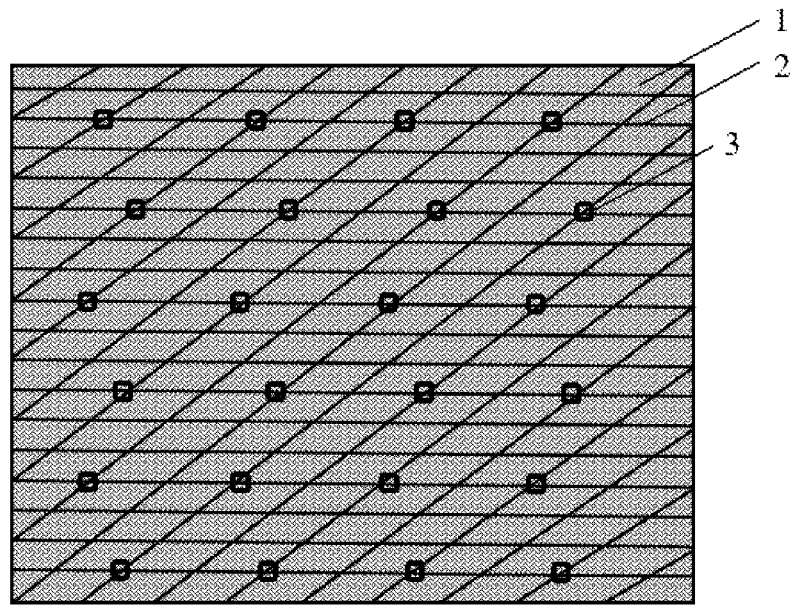
FIG. 1 is a schematic structural diagram of an electric geotextile part of an electric geotextile complex provided by an embodiment of the present application.
Figure 2:
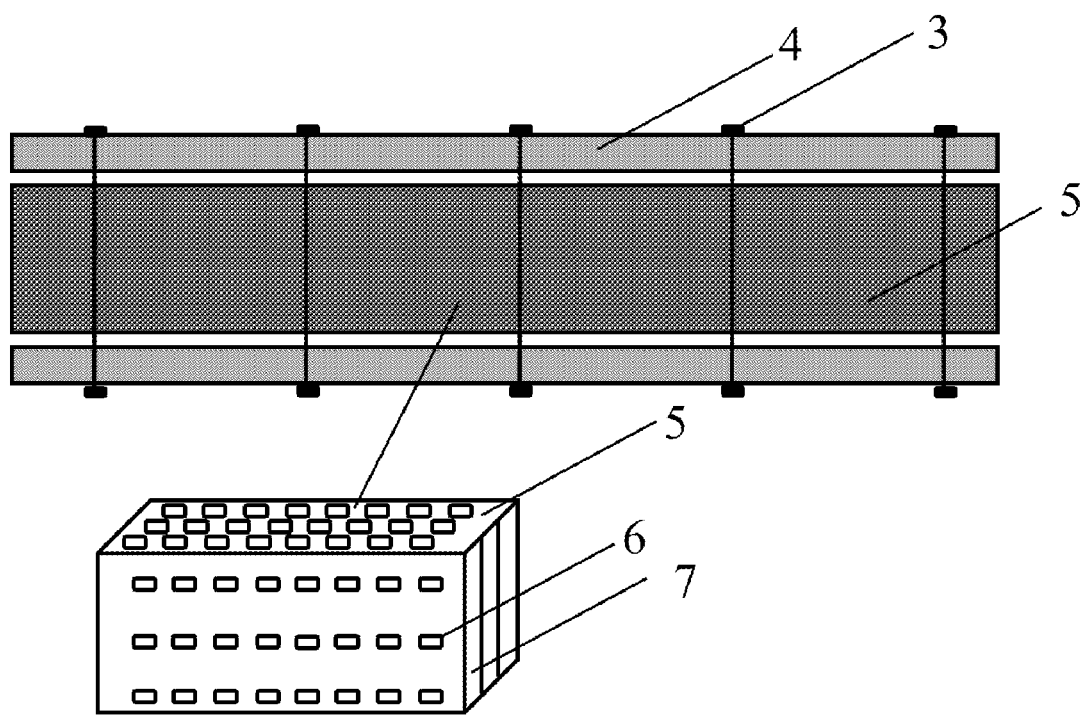
FIG. 2 is a front view of an electric geotextile complex provided by an embodiment of the present application.

In this embodiment, firstly, an electric geotextile complex 8 is prepared. As shown in FIGS. 1 and 2, the electric geotextile complex has a three-layer structure, in which the upper and lower layers are electric geotextiles 4 formed by fibers 1 and conductive materials 2 interweaved with each other, and the middle layer is a flexible drainage plate 5 with a drainage channel 7 inside. In this embodiment, three drainage channels are formed by two supporting partitions, and drainage holes 6 are formed on the surface of the flexible drainage plate 5. The three layers are fixed by a flexible lap joint 3, the surface drainage holes 6 of the flexible drainage plate 5 are used for collecting the water discharged from the surrounding sludge, and the internal drainage channel 7 is used for horizontally discharging the water in the sludge into a drainage ditch 9.

In an embodiment, the fiber 1 of the electric geotextile 4 can be terylene, polyester fiber, non-woven fabric, etc., which has good water permeability and can filter the sludge. The conductive material 2 can be carbon fiber, carbon black, graphite powder, conductive metal and the like. The proportion of the conductive material 2 in the electric geotextile 4 can be no less than 5% by mass. The flexible drainage plate 5 is made of plastic with good flexibility, and can be prepared by mixing polypropylene (PP) and polyethylene (PE), with both rigidity and flexibility. The three layers of the electric geotextile complex 8 are flexibly overlapped and fixed by the flexible lap joint 3 made of terylene or polyester fibers, so that the three layers are integral without sliding.

Figure 3:
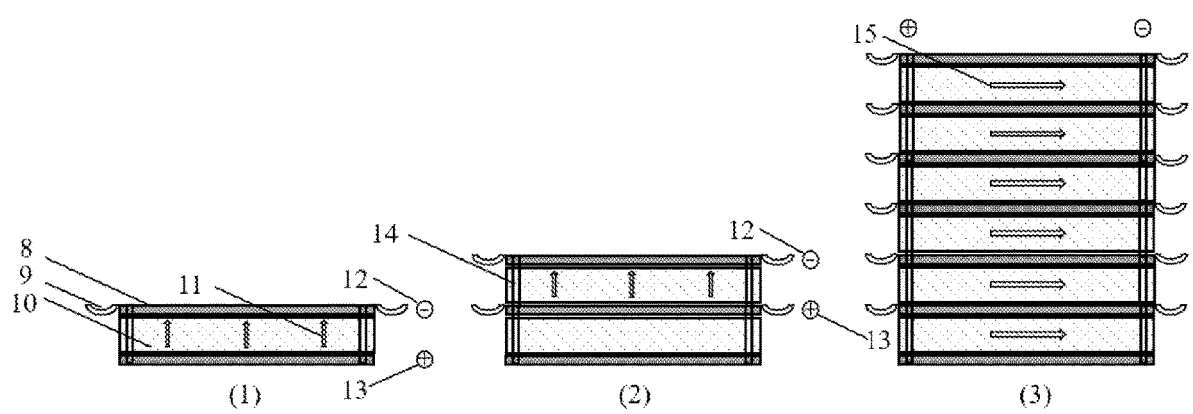
FIG. 3 is a schematic diagram of three-dimensional continuous electroosmosis drainage reinforcement provided by an embodiment of the present application.

In this embodiment, after the electric geotextile complex 8 is prepared, the sludge is rapidly consolidated and reinforced by a three-dimensional and continuous electroosmosis drainage method, and the main steps are as follows:

(1) Construction is carried out according to the (1) in FIG. 3; a layer of electric geotextile complex 8 is firstly paved at the bottom of the site, sludge 10 is spread or hydraulically filled on the geotextile complex 8, then it is covered with another layer of the electric geotextile complex 8; drainage ditches 9 are arranged on both sides of the upper geotextile complex 8, vertical flexible conductive tubes 14 are inserted on both sides of the geotextile complex 8, thereby completing paving of the first layer, wherein a plurality of vertical flexible conductive tubes 14 can be inserted in the same row with a certain distance between adjacent ones.

(2) The upper geotextile complex 8 of the first layer is connected to the cathode 12 of the power supply, and the lower geotextile complex 8 is connected to the anode 13 of the power supply; the power supply is turned on to start electroosmosis (the electroosmosis water flow direction being vertically upward 11), and the discharged water is continuously collected by the drainage ditches 9 on both sides with water pumps.

(3) After the electroosmosis of the first layer of sludge 10 is completed, construction is carried out according to (2) in FIG. 3, then another layer of sludge 10 is paved on the electric geotextile complex 8, and then is covered with a new layer of the electric geotextile complex 8 on the top of the sludge; drainage ditches 9 are arranged on both sides of the upper geotextile complex 8, and vertical flexible conductive tubes 14 are inserted on both sides of the geotextile complex 8 to be connected with the vertical flexible conductive tubes 14 that is inserted into the first layer of sludge 10 to complete paving of the second layer; the upper geotextile complex 8 of the second layer is connected to the cathode 12 of the power supply, and the lower geotextile complex 8 is connected to the anode 13 of the power supply; the power supply is turned on to start electroosmosis (at this time, the cathode in step (2) is converted into an anode), and the discharged water is collected by the drainage ditches 9 on both sides; the above process repeated, and sludge is loaded layer by layer for electroosmosis.

(4) After loading the multi-layer sludge, the construction shall be carried out according to (3) in FIG. 3. As vertical flexible conductive tubes 14 in all layers are connected at both sides during the loading of each layer of the sludge, all conductive tubes on one side are finally connected to the anode 13 of the power supply and all conductive tubes on the other side are connected to the cathode 12 of the power supply, so that a horizontal integral electroosmosis drainage reinforcement is carried out (the electroosmosis water flow direction is horizontal 15), and the discharged water is collected by the drainage ditch 9 on the cathode side.

When electroosmosis drainage is carried out, the increasing preloading pressure on an upper part will have a consolidation drainage action on the sludge in a lower layer, and at the same time increase a constraining force on each layer of the geotextile complex, thus enhancing the reinforcement effect of the geotextile complex on the soil body.

In addition, after completing one time of horizontal electroosmotic drainage reinforcement, the cathode and the anode are exchanged, and the electroosmotic drainage reinforcement in an opposite direction is started, so that the effect of water content reduction in the sludge is balanced, and the overall drainage effect is improved.

The above embodiments are only exemplary embodiments of the present application, and are not intended to limit the scope of the present application. Equivalent changes and modifications made by a person skilled in the art without departing from the concepts and principles of the present application shall fall into the scope of protection of the present application.

What is claimed is:

1. A sludge three-dimensional electroosmosis drainage reinforcing method based on an electric geotextile complex, comprising:

(1) constructing the electric geotextile complex, wherein the electric geotextile complex is a complex with a three-layer structure, an upper layer and a lower layer are electric geotextiles formed by fibers and conductive materials interweaved with each other, and a middle layer is a flexible drainage plate; a proportion of the conductive materials in the electric geotextiles is no less than 5% by mass; a drainage channel is arranged inside the flexible drainage plate, and a drainage hole is arranged on a surface of the flexible drainage plate, and the three layers are flexibly overlapped and fixed; the drainage hole on the surface of the flexible drainage plate is used for collecting water discharged from surrounding sludge, and an internal drainage channel is used to horizontally discharge the water in the sludge into a drainage ditch;

(2) during construction, paving a layer of the electric geotextile complex at a bottom of a site, spreading or hydraulically filling the sludge on the geotextile complex, then covering a new layer of the electric geotextile complex, arranging drainage ditches on both sides of the upper geotextile complex, and inserting vertical flexible conductive tubes on both sides of the geotextile complex to complete paving of a first layer;

(3) connecting the upper geotextile complex of the first layer to a cathode of a power supply, and connecting the lower geotextile complex to an anode of the power supply; powering on to start electroosmosis and collecting discharged water by the drainage ditches on both sides;

(4) after electroosmosis of the first layer is completed, paving another layer of sludge on the electric geotextile complex, and then covering a new layer of the electric geotextile complex on the top of the sludge; arranging drainage ditches on both sides of the upper geotextile complex, and inserting vertical flexible conductive tubes on both sides of the geotextile complex to be connected with the vertical flexible conductive tubes that is inserted into the sludge in the first layer to complete paving of a second layer; connecting the upper geotextile complex of the second layer to the cathode of the power supply, and connecting the lower geotextile complex to the anode of the power supply; powering on to start electroosmosis and collecting discharged water by the drainage ditches on both sides; repeating the above process, and paving the sludge layer by layer for electroosmosis;

(5) after loading of a plurality of layers of the sludge is completed, connecting all conductive tubes on one side to the anode of the power supply and all conductive tubes on the other side to the cathode of the power supply, so as to implement a horizontal integral electroosmosis drainage reinforcement, and collecting discharged water by the drainage ditch on a cathode side; wherein each layer is firstly subjected to electroosmosis drainage in a vertical direction, and finally subjected to integral electroosmosis reinforcement in a horizontal direction; when electroosmosis drainage is carried out, an increasing preloading pressure on an upper part will have a consolidation drainage action on the sludge in a lower layer, and at the same time increase a constraining force on each layer of the geotextile complex, thus enhancing the reinforcement effect of the geotextile complex on the soil body;

after completing one time of horizontal electroosmotic drainage reinforcement, the cathode and the anode are exchanged, and the electroosmotic drainage reinforcement in an opposite direction is started, so that the effect of water content reduction in the sludge is balanced, and the overall drainage effect is improved.

2. The method according to claim 1, wherein the fibers of the electric geotextile are terylene, polyester fiber and non-woven fabric, which have good water permeability and are capable of filtering the sludge at the same time; the conductive materials are carbon fiber, carbon black, graphite powder and conductive metals.

3. The method according to claim 1, wherein the flexible drainage plate is made of plastic, and is prepared by mixing polypropylene (PP) and polyethylene (PE), with both rigidity and flexibility.

4. The method according to claim 1, wherein the three layers of the electric geotextile complex are flexibly overlapped and fixed by terylene or polyester fibers, so that the three layers are integral without sliding.

* * * * *